United States Patent [19]
Hayward

[11] 4,172,402
[45] Oct. 30, 1979

[54] BAND WHEEL MOUNTING DEVICE FOR BAND SAW
[75] Inventor: Walter W. Hayward, Loveland, Colo.
[73] Assignee: Choice Cut Corporation, Loveland, Colo.
[21] Appl. No.: 898,927
[22] Filed: Apr. 24, 1978
[51] Int. Cl.² .............................................. B26D 1/46
[52] U.S. Cl. ........................................ 83/817; 83/820
[58] Field of Search ........................... 83/817, 820, 818
[56] References Cited
U.S. PATENT DOCUMENTS

| 126,602 | 5/1872 | Whitney | 83/817 |
|---|---|---|---|
| 151,217 | 5/1874 | Gordon | 83/817 |
| 170,577 | 11/1875 | Margedant | 83/817 |
| 1,967,724 | 7/1934 | Ponton | 83/817 |
| 2,274,923 | 3/1942 | Hedgpeth | 83/817 |
| 2,664,118 | 12/1953 | Krumbach | 83/817 |

Primary Examiner—Frank T. Yost
Attorney, Agent, or Firm—Hugh H. Drake

[57] ABSTRACT

A pulley wheel mounting device for use with a continuous band saw blade trained over a plurality of band wheels. The adjustable mounting means supports at least one of the band wheels on the frame for rotation about a horizontal axis of rotation and for adjusting the vertical plane of alignment of said wheel about a generally horizontal diameter thereof. The mounting means includes a cylindrical trunnion and cradle assembly with an eccentric adjustment shaft engaged with a headed bolt supporting the trunnion, cradle and band wheel.

7 Claims, 7 Drawing Figures

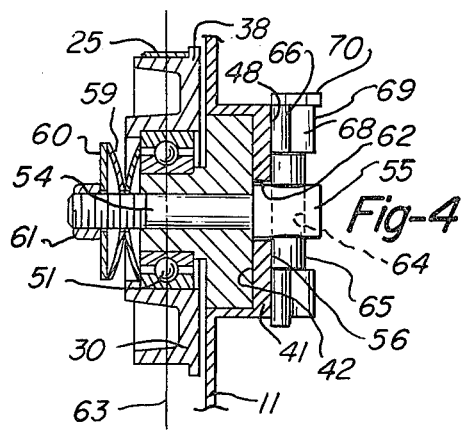
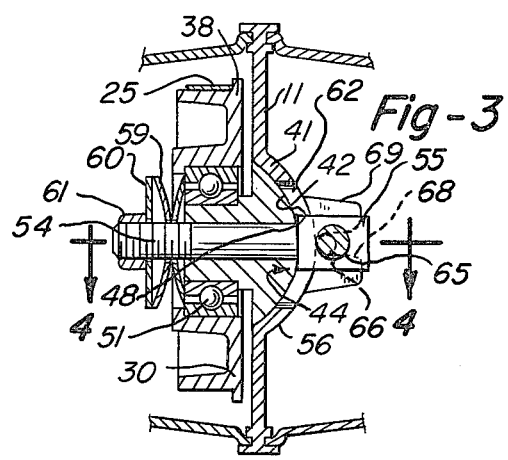
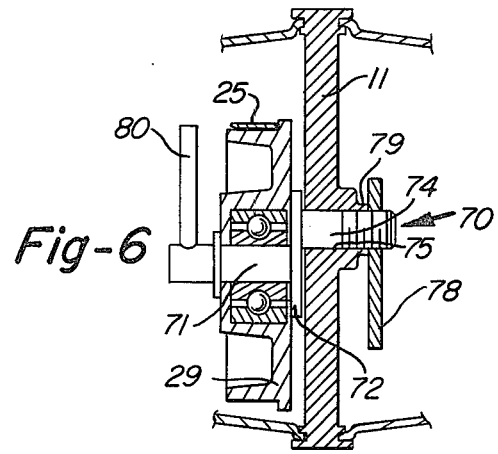
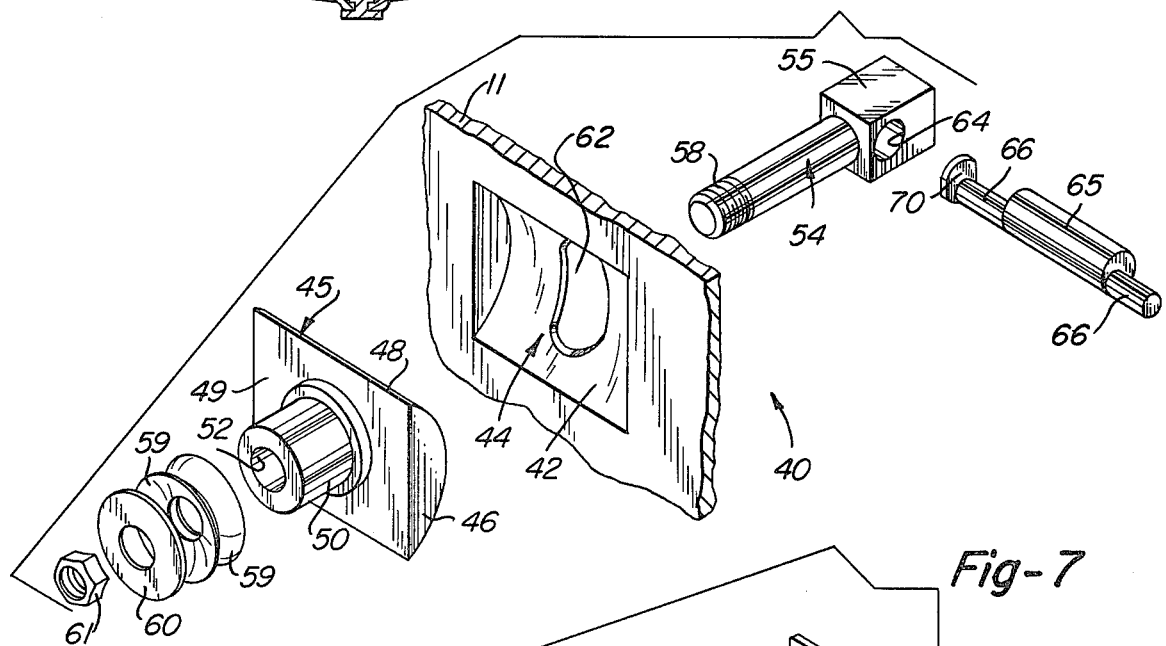
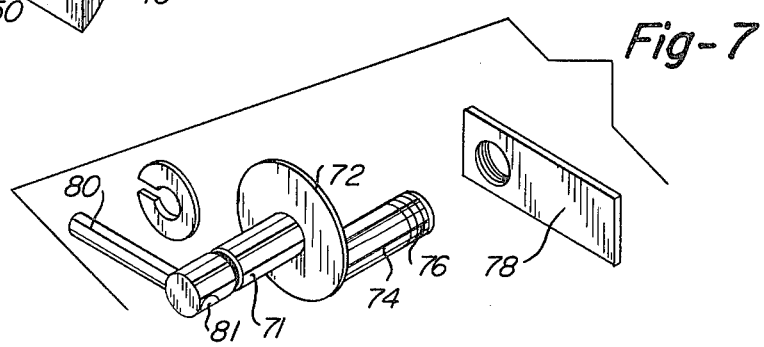

BAND WHEEL MOUNTING DEVICE FOR BAND SAW

FIELD OF THE INVENTION

The present invention relates to a band saw finding particular but not necessarily exclusive utility for cutting meat products. More especially, the present invention relates to a mounting device for a band saw wheel to facilitate adjustment of the band saw alignment.

BACKGROUND OF THE INVENTION

Band saws have been widely utilized for cutting meat products. This type of equipment, including band saws for a variety of applications, is well known in the art. See, for example, the following U.S. Pat. Nos. 1,562,732—Arsneau; 1,879,145—Erickson; 2,511,989—Nardi; 2,625,964—Green et al; 2,705,510—Stocke; 2,774,131—Crane; 2,843,917—Crane; 2,969,815—Lasar; 2,972,669—Brown; 3,142,321—Orescan; 3,390,598—Sands et al.; and 3,521,682—Schnizler, Jr.

It has been recognized that at least one of the band wheels must be adjustable in order to be able to adjust the alignment of the band saw and prevent it from riding up or down on the band wheel rim. Various devices have been utilized for adjusting the alignment of the band saw and band wheels. See, for example, the following U.S. Pat. Nos.: 1,329,990—Vaughan; 2,664,118—Krumbach; 2,825,369—Karp et al.; and 2,963,054—Eschenburg.

The approaches taken by the prior art generally involve the use of a screw acting against a fulcrum plate on which the band wheel is mounted. The axis of rotation in the prior art constructions is generally spaced away from the band wheel itself, thereby creating problems in obtaining the desired adjustment since the entire band wheel is being swung in an arc about a remote axis.

OBJECTS AND SUMMARY OF THE INVENTION

It is the principal object of the present invention to provide an improved band saw finding particular but not necessarily exclusive utility for cutting meat products.

A further prinicipal object of the present invention is to provide an improved band saw band wheel mounting arrangement which facilitates adjustment of band saw alignment.

Another object of the present invention is to provide an improved band wheel mounting mechanism which provides for ease of adjustment of the blade tracking alignment.

A further object of the invention is to provide a band wheel mounting assembly of the foregoing character which is simple, rugged, easy-to-use, and requires no special tools or adjustments.

Other objects and advantages of the present invention will become apparent from the accompanying drawings and following description.

In accordance with the foregoing objects, the present invention is embodied in a band saw which includes a generally C-shaped integral frame with appropriate covers and mounting stand. A plurality of band wheels, four in the present instance, are mounted, one at each corner of the C-shaped frame, and a saw band is trained about the four band wheels. One of the band wheels is directly driven by a small horsepower motor, one of the wheels includes means for tightening the tension on the saw band, and another of the wheels is an idler. The fourth wheel is adjustable for adjusting the alignment of the band saw with respect to the band guide and table, as well as the other band wheels. This adjustment is important in order to prevent the band from riding up or down on the band wheels with the attendant danger that the band will come off the wheels during operation of the band saw.

The adjustable band wheel mounting structure is formed by an arcuate wall on the C-shaped frame defining a generally horizontal concave cylindrical cradle. A vertically elongated adjustment slot is formed in the base of the cradle. A pair of spaced ears on the convex side of the arcuate wall are utilized for adjustment purposes as will be explained.

The band wheel is mounted on a tubular shaft extending horizontally from the planar surface of a cylindrical segment trunnion, the trunnion being supported in the cradle. A headed bolt is provided with a threaded end extending through the slot and wheel shaft bore with the bolt head positioned between the spaced ears on the arcuate wall. A nut and Belleville spring assembly clamps the bolts to the wheel shaft when the wheel is mounted on the shaft. Appropriate bearings are utilized between the shaft and the wheel.

In order to rotate the wheel about a generally horizontal diametric axis, the bolt head is raised and lowered thereby partially rotating the trunnion in the cradle. To this end, an eccentric rod is provided with a central cylindrical portion extending through an aperture in the bolt head. A pair of offset aligned pin ends on the eccentric rod are received in the slots in the ears. By rotating the eccentric rod, the bolt head is raised or lowered. For this purpose, one of the pin ends includes an enlarged portion defining a wrench pad.

In operation, the bolt head is raised or lowered by rotating the eccentric rod. This pivots the trunnion about its central longitudinal axis which corresponds generally to a horizontal diameter of the band wheel. If desired the nut on the end of the threaded shaft can be loosened to permit the adjustment, although a Belleville spring assembly provides sufficient slack to permit adjustment and yet is sufficiently tight to prevent the wheel from slipping once the adjustment had been made.

DESCRIPTION OF THE DRAWINGS

FIG. 3 is a section view taken substantially in the plane of line 3—3 on FIG. 2.

FIG. 4 is a section view taken substantially in the plane of line 4—4 on FIG. 3.

FIG. 5 is an exploded view of the alignment adjusting mechanism for the band wheel shown in FIGS. 3 and 4.

FIG. 6 is a section view taken substantially in the plane of line 6—6 on FIG. 2.

FIG. 7 is an exploded perspective view of the band wheel tightening mechanism shown in FIG. 6.

DESCRIPTION OF THE PREFERRED EMBODIMENT

Figure 1:
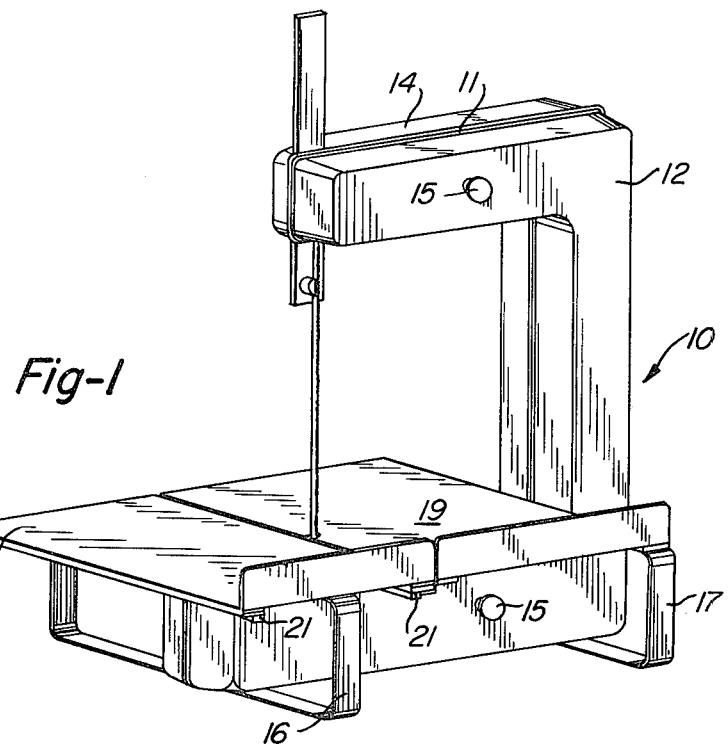
FIG. 1 is a perspective view of a band saw embodying the present invention.
Figure 2:
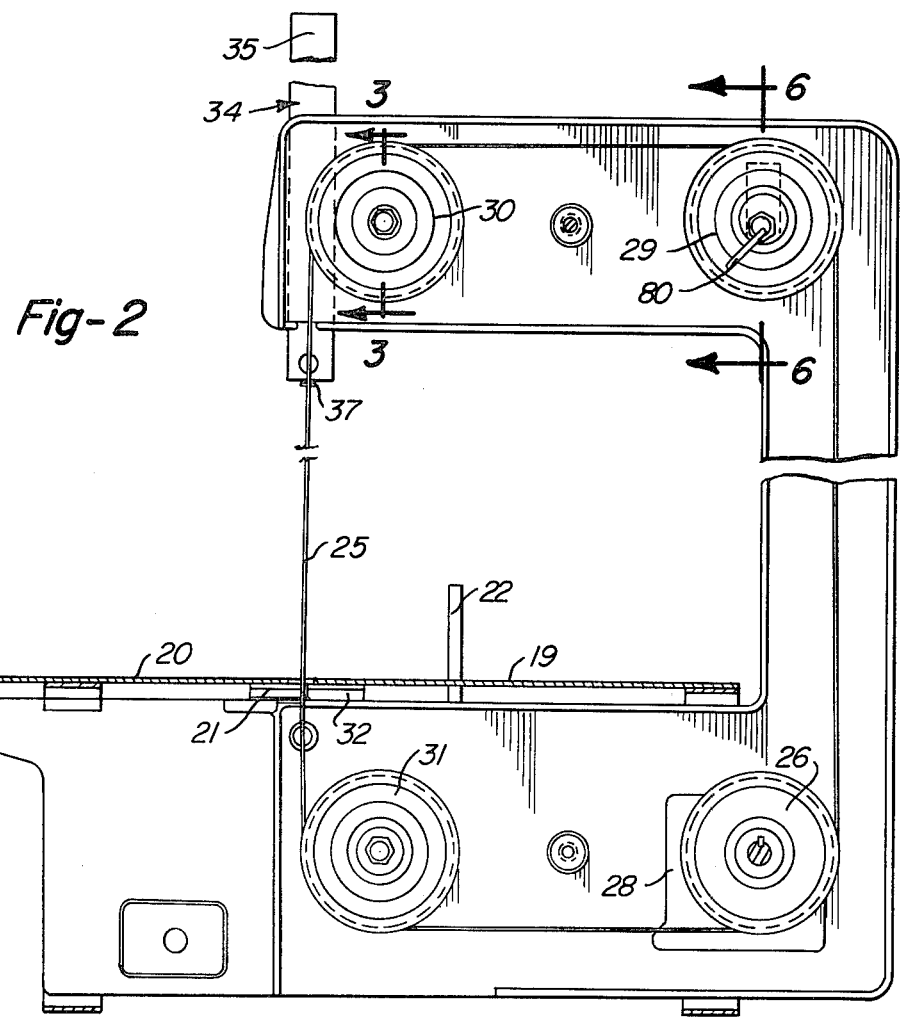
FIG. 2 is an elevation view of the band saw shown in FIG. 1 with the wheel enclosing cover removed.

A band saw embodying the present invention is shown at 10 in FIG. 1. The saw is formed by a generally C-shaped main frame 11 formed of lightweight, high strength aluminum. The frame is designed to provide the desired clearance and depth of throat for cutting large pieces of meat. Front and rear covers 12, 14 are provided for covering the open channel of the C-shaped frame 11 and appropriate clamping knobs 15 are utilized to secure the covers 12, 14 to the frame. The frame 11 is mounted on an appropriate base support or stand including front and rear leg members 16, 17. The unit is adaptable for mounting on a bench or table (not shown). The saw includes a fixed table 19 secured to the frame and a movable table 20 slidably mounted on guide rails 21. An adjustable fence 22 is mounted on the fixed table portion 19.

For supporting and driving a band saw blade 25 there is provided, in the embodiment shown in the drawings, four band wheels including a drive wheel 26 mounted on the output shaft of a motor 28 mounted on the C-shaped frame 11 at the lower rear corner thereof. Directly above the drive wheel there is provided a tension band wheel 29 which is adjustable to reduce or increase the tension on the saw blade 25. Directly in front of the tension band wheel there is provided an alignment adjustment wheel 30 mounted on the C-shaped frame 11 in a manner to be described. Directly below the alignment adjusting band wheel 30 and in front of the drive wheel 26, there is provided an idler wheel 31. The band saw blade 25 is trained around the four wheels and its tension adjusted by positioning the tension wheel 29 in a manner to be described. The blade extends vertically through the mouth of the C-frame 11 and through a fixed blade guide 32 in the fixed table 19. An upper blade guide 34 is adjustably mounted on the forward upper arm of the C-shaped frame 11. The adjustable blade guide 34 includes a vertically adjustable bar 35 mounted on a slide 36 on the frame. At its lower end the bar 35 is provided with a blade guide 37. Wheel 30 has an outwardly projecting rim 38 on its peripheral margin nearest to frame 11.

For mounting the blade aligning band wheel 30 on the frame in a manner facilitating expedient adjustment thereof about an axis which corresponds with a substantially horizontal diameter lying between the inner and outer faces of the wheel 30, the present invention contemplates an improved adjustable mounting mechanism 40 supporting the alignment adjusting band wheel 30. To this end, an arcuate wall 41 on the C-shaped frame 11 is formed with an interiorly concave surface 42 defining a concave cylindrical cradle 44 adapted to matingly receive a correspondingly shaped trunnion 45. The trunnion 45, as shown in the drawings, is formed as a cylindrical segment 46 presenting an exterior outwardly convex cylindrical surface 48 adapted to slidingly and supportingly engage with the corresponding concave interior wall 42 of the cradle. On its opposite exterior planer surface 49 the trunnion 45 forms a tubular band wheel stub shaft 50 adapted to receive and support the interior race of a ball bearing assembly 51 exteriorly rotatably mounting the band wheel 30. A bore 52 extends through the shaft 50 and the trunnion 45 and opens into both the exposed end of the shaft 50 and the trunnion wall 48.

The trunnion 45, together with the bearing 51 and band wheel 30 mounted thereon, is adjustably retained within the cradle 44 by a mounting and adjustment bolt 54 and cam 65. The bolt 54 includes an apertured head 55 at one end and its opposite end is formed with threads 58 which extend outwardly from the stub shaft 50 through a Belleville spring 59 and associated washers 60 for engagement by a lock nut 61. For receiving the bolt and at the same time allowing for swinging movement of the trunnion with respect to the cradle, an elongated bolt slot 62 is defined in the arcuate wall 41.

With the foregoing construction, it can be readily observed that by rotating the trunnion 45 in the cradle 44, which is effectively accomplished by moving the bolt head 55 either up or down with respect to the cradle wall 41, the band wheel 30 is pivoted about a horizontally extending axis 63 which effectively corresponds to a horizontal diameter of the wheel lying in the horizontal diameterical plane bounded by the outer and inner faces of the wheel. That is, axis 63 is the axis of the cylinder of which trunnion 46 is a segment, and it also is co-extensive with a horizontal diameter of wheel 30. This pivoting movement effectively adjusts the vertical planer position of the wheel 30. By making slight adjustments in the vertical alignment of the wheel 30, the band saw 25 is centered on the peripheral rim of the wheel and any tendency of the band saw to ride up or down on the band wheel can be corrected.

For retaining, positioning and adjusting the position of the band wheel 30, the bolt head 55 is provided with an aperture 64 in which is received a cylinder or cam 65 having eccentrically defined opposite end pins or shafts 66. The cam 65 rides on and against the rear surface 56 of the arcuate wall 41 while the bolt head 55 extends into and is guided by the slot 62. The pins 66 are received in corresponding slots 68 defined in spaced ears 69 projecting from the exterior or rear surface of the arcuate wall 41 on opposite sides of the elongated slot 62. By rotating the pins or shafts 66, the eccentric cylinder or cam 65, which extends through the bolt head aperture 64, tends to raise or lower the bolt head depending upon the direction of rotation. To facilitate this adjustment, one of the pins 66 is provided with a wrench pad 70. It will be appreciated that only a small amount of adjustment of the bolt head 55 is required to effect the desired tilt adjustment of the band wheel 30. So long as the nut 61 is sufficiently tight on the bolt, the cam 65 is held tightly against the arcuate wall 41 and the adjustment is maintained during operation of the saw.

For purposes of tightening the tension in the band saw blade, or alternatively, for releasing the tension to permit removal and replacement of the blade 25, another of the band wheels 29 constitutes a tension wheel which is adjustably mounted to permit adjustment of the blade tension. To this end there is provided an eccentric wheel mounting shaft and bolt 70 as shown in FIGS. 6 and 7. The tension adjusting device includes a wheel supporting stub shaft 71 mounted on a mounting plate 72 from which extends eccentrically, or in an off-center position, a mounting bolt 74 adapted to extend through an appropriate aperture 75 in the C-frame 11. The free end of the bolt 74 is threaded as at 76 for threadable engagement with a clamp handle 78 adapted to be tightened against a boss 79 on the C-frame 11. By releasing the handle, the wheel shaft 71 can be rotated by means of an adjustment rod 80 engaged in an aperture 81 in the wheel shaft. As the rod 80 turns the shaft, the position of the shaft is swung about the axis of the mounting bolt 74. In this manner the wheel 29 swings to either tighten or loosen the band, depending upon the direction of rotation of the handle 80. When the desired tension adjustment has been completed, the clamping handle 78 is tightened against the C-frame 11 to securely hold the adjustment wheel 29 in the desired position.

While certain illustrative embodiments of the present invention have been shown in the drawings and described above in considerable detail, it should be understood that there is no intention to limit the invention to the specific form disclosed. On the contrary, the intention is to cover all modifications, alternative constructions, equivalents, and uses falling within the spirit and scope of the invention as expressed in the appended claims.

What is claimed is:

1. A pulley wheel mounting device for supporting a pulley wheel on a frame for axial rotation and for adjusting the plane of alignment of said wheel about a diameter thereof, said mounting device comprising:
   a cylindrical cradle defined on said frame;
   a trunnion mated with and supported in said cradle, said trunnion having the shape of a segment of a cylinder the axis of which lies in said plane;
   a wheel shaft extending from said trunnion for rotatably supporting said wheel in a position to locate said diameter thereof co-extensively with said axis;
   means for adjustably holding said trunnion in said cradle;
   and means for swinging said trunnion in said cradle thereby to swing said wheel about said diameter for adjusting the position of said plane of said wheel with respect to said frame.

2. A pulley wheel mounting device as defined in claim 1 wherein said means for adjustably holding said trunnion in said cradle and for swinging said trunnion relative to said cradle comprises a headed bolt extending through a slot defined in said cradle and said tubular wheel shaft, said bolt having an end extending outwardly from said tubular shaft, means engageable with said bolt end for clamping said bolt to said shaft when said wheel is mounted thereon, and a clamping and adjusting means engageable between said head and said cradle for adjustably holding said bolt with respect to said cradle.

3. A pulley wheel mounting device as defined in claim 2 wherein said cradle is formed by an arcuate wall on said frame defining a concave cylindrical cradle, said wall having an elongated slot defined therein in a circumferential direction and a pair of spaced ears on the convex side thereof, each of said ears defining a central slot generally parallel to said axis, said clamping and adjusting means comprising an eccentric rod having a central cylindrical portion extending through an aperture defined in the bolt head and engaging the exterior surface of said cradle, and a pair of offset aligned pin ends received in said ear slots, rotation of said eccentric rod being effective to move said bolt head laterally and thereby adjust the planer position of said wheel relative to said frame.

4. A pulley wheel mounting device for supporting a pulley wheel on a frame for axial rotation and for adjusting the plane of alignment of said wheel about a diameter thereof, said mounting device comprising:
   an arcuate wall on said frame defining a concave cylindrical cradle;
   means defining an elongated circumferentially-directed slot in said arcuate wall;
   a pair of spaced ears on the convex side of said arcuate wall, said ears each defining a central slot generally parallel to said axis;
   a trunnion mated with and supported in said cradle, said trunnion having the shape of a segment of a cylinder the axis of which lies in said plane;
   a tubular wheel shaft extending from said trunnion for rotatably supporting said wheel in a position to locate said diameter thereof co-extensively with said axis;
   a headed bolt extending through said slot and wheel shaft with said head positioned between said ears;
   said bolt having an end extending outwardly from said tubular shaft, means engageable with said bolt end for clamping said bolt to said shaft when said wheel is mounted thereon;
   and means for moving said bolt head laterally relative to said ears for swinging said bolt and trunnion in said cradle thereby to swing said wheel about said diameter for adjusting the position of said plane of said wheel with respect to said frame, said moving means comprising an eccentric rod having a central cylindrical portion received in an aperture defined in said bolt head and a pair of offset aligned pin ends received in said ear slots, and said rod being rotatable to move said bolt head laterally and thereby adjust the position of said plane of said band wheel.

5. In a band saw including a continuous band saw blade trained over a plurality of band wheels mounted on a generally C-shaped frame, adjustable mounting means for supporting at least one of said wheels on said frame for axial rotation and for adjusting the plane of alignment of said wheel about a diameter thereof, said mounting means comprising:
   an arcuate wall on said C-shaped frame defining a concave cylindrical cradle;
   means defining an elongated circumferentially-directed slot in said arcuate wall;
   a pair of spaced ears on the convex side of said arcuate wall, said ears each defining a central slot generally parallel to said axis;
   a trunnion mated with and supported in said cradle, said trunnion having the shape of a segment of a cylinder the axis of which lies in said plane;
   a tubular wheel shaft extending from the planer surface of said segment for rotatably supporting said wheel in a position to locate said diameter thereof co-extensively with said axis;
   a headed bolt extending through said slot and wheel shaft bore with said head positioned between said ears, said bolt having an end extending outwardly from said tubular shaft;
   means engageable with said bolt end for clamping said bolt to said shaft when said wheel is mounted thereon;
   and means for moving said bolt head laterally relative to said ears for swinging said bolt and trunnion in said cradle thereby to swing said wheel about said diameter for adjusting the position of said plane of said wheel with respect to said C-shaped frame, said means comprising an eccentric rod having a central cylindrical portion extending through an aperture defined in the bolt head and a pair of offset aligned pin ends received in said ear slots, said rod being rotatable to move said bolt head laterally and thereby adjust the position of said plane of said wheel relative to said frame.

6. In a band saw including a continuous band saw blade trained over a plurality of band wheels mounted on a generally C-shaped frame, adjustable mounting means for supporting at least one of said wheels on said frame for axial rotation and for adjusting the plane of alignment of said wheel about a diameter thereof, said mounting means comprising:
- a cylindrical cradle defined on said frame;
- a trunnion mated with and supported in said cradle, said trunnion having the shape of a segment of a cylinder the axis of which lies in said plane;
- a tubular wheel shaft extending from said trunnion for rotatably supporting said wheel in a position to locate said diameter thereof co-extensively with said axis;
- means for adjustably holding said trunnion in said cradle;
- and means for swinging said trunnion in said cradle thereby to swing said wheel about said diameter for adjusting the position of said plane of said wheel with respect to said frame.

7. In a band saw as defined in claim 6, a rim projecting outwardly from the peripheral margin of said one wheel on the side thereof adjacent to said frame.

* * * * *